Nov. 21, 1933.　　　T. A. RONSTROM　　　1,935,919
TANK WATER HEATER
Original Filed March 21, 1930　　2 Sheets-Sheet 1
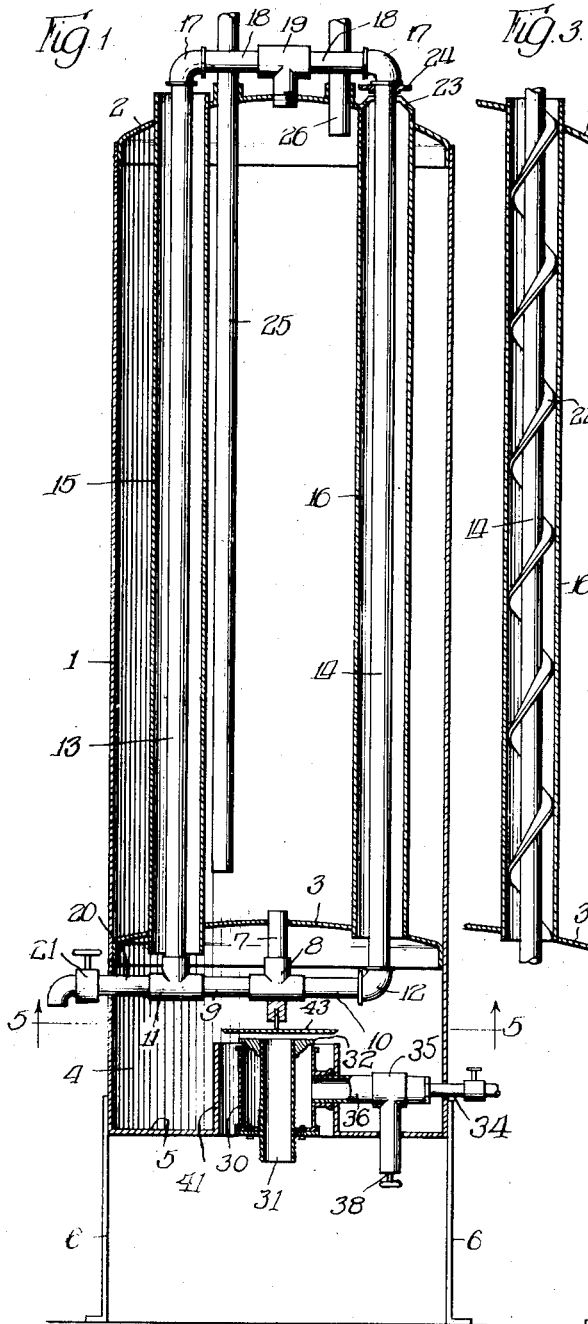
Inventor:
Thomas A. Ronstrom,
By Kent W. Worrell
Atty.

Nov. 21, 1933.　　　T. A. RONSTROM　　　1,935,919
TANK WATER HEATER
Original Filed March 21, 1930　　2 Sheets-Sheet 2
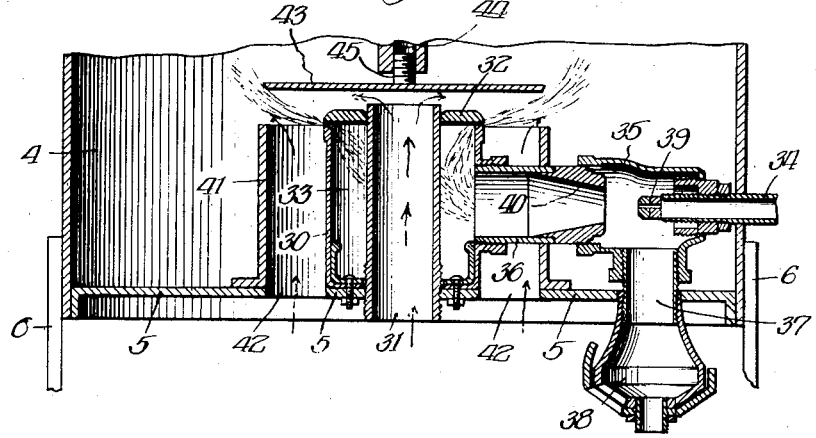
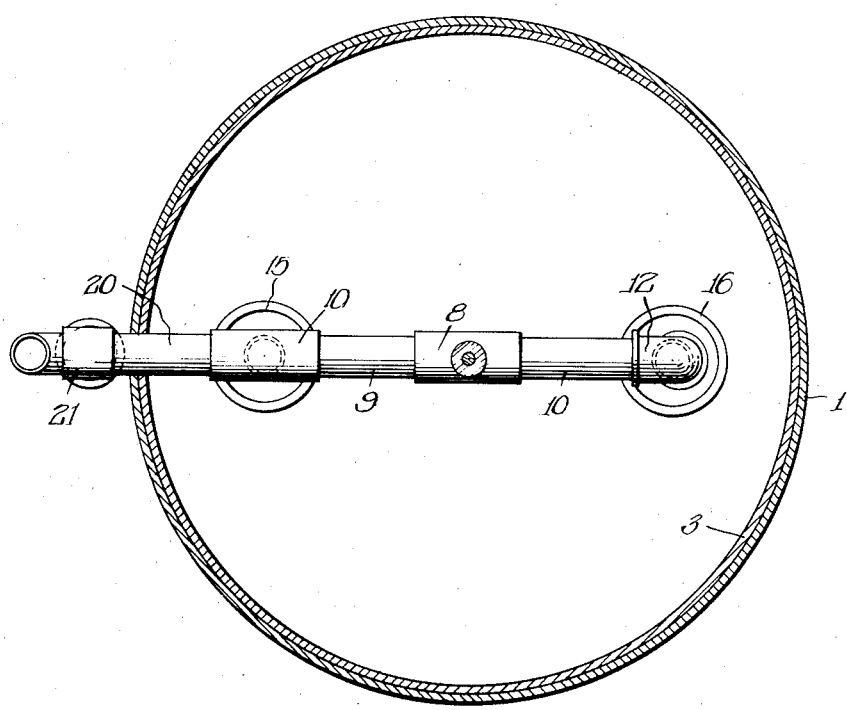
Inventor:
Thomas A. Ronstrom,
By Kent W. Worrell  Atty Patented Nov. 21, 1933

1,935,919

UNITED STATES PATENT OFFICE 1,935,919

TANK WATER HEATER

Thomas A. Ronstrom, Chicago, Ill.

Application March 21, 1930, Serial No. 437,672
Renewed April 17, 1933

9 Claims. (Cl. 122—16)

This invention relates in general to a tank water heater and has more particular reference to a multiple tube tank with air controlling means for obtaining high heating efficiency.

An important object of this invention is to provide a tank water heater, of simple construction, which may be assembled easily, and having a comparatively large area of heating surface.

Another object of this invention is to provide a water heater, which may be used in lime water territories, without being clogged with lime.

A further object of this invention is to arrange the heat generating means and the heat absorbing elements within the heater, so as to cause the heat gases to pass into the heat absorbing section of the heater at the highest possible temperature, and during their passage therethrough, to be brought in close and intimate contact with the heat absorbing elements therein.

In this connection there is a distinct cooperation between the burner used to generate heat and the method by which the transmission of heat to the water in the tank is improved.

Ordinarily the temperature of the products of combustion is reduced by an inefficient adjustment of the secondary air supply, as the secondary air intake openings generally are located too far from the point of combustion, and as a consequence, a considerable proportion of the secondary air, admitted into the combustion chamber, passes through the same outside of the zone of combustion. The admission into the combustion chamber of an excess of unused air, reduces the temperature and increases the volume of the heated gases thereby causing them to pass too rapidly through the combustion chamber.

Ordinarily the supply of secondary air is adjusted by the capacity of the exit opening in the upper part of the flue pipe in conjunction with the air intake openings in the lower part of the combustion chamber; a wide open exit at the top causes the air to flow rapidly into and through the combustion chamber, while a reduced exit opening results in a slower passage of air into and through the combustion chamber.

Other objects of the invention will appear hereinafter, and will be shown in the drawings which illustrate preferred embodiments of the invention.

In the drawings, Fig. 1 is a sectional view of a tank water heater constructed in accordance with the principles of the invention having two water tubes; Fig. 2 is a similar view of a single water heating tube tank; Fig. 3 is a fragmentary view of a heating tube; Fig. 4 is an enlarged sectional view of a burner for the tank; and Fig. 5 is a section taken on the line 5—5 of Fig. 1.

The burners illustrated in the drawings in conjunction with that part of the combustion chamber adjacent the burner top adjusts the supply of secondary air by a radically different method, inasmuch as the flow of secondary air is concentrated on the point of combustion, and no air can enter the combustion chamber except through the zone of combustion.

The result of this arrangement is that the amount of unused air admitted into the combustion chamber is reduced to a minimum and as a consequence the heated gases pass into the heating chamber practically undiluted by unused air and therefore at a much higher temperature than would be possible, if the air supply were to be adjusted by the usual methods.

The construction of the burner and combustion chamber causes the secondary air and the products of combustion to pass rapidly through the zone of combustion, the result being perfect combustion and an efficient generation of heat.

Referring more particularly to the drawings, a sheet metal tank 1 having a top 2 and a bottom 3 has extended bottom sides forming a combustion chamber 4 with a bottom 5 and is supported in upright position by legs 6.

Inserted through the bottom of the tank to extend above the surface thereof is a short nipple 7, in Figure 1, connected to a fitting 8 from which extend short pipes 9 and 10 connected respectively to a T 11 and an elbow 12. Extending upwardly through the tank and connected to the T and elbow respectively are pipes 13 and 14 which are surrounded by but spaced from tubes 15 and 16 secured to the top and bottom of the tank and forming an annular heat passage surrounding the pipes 13 and 14 and the pipes 15 and 16 providing an enlarged heating surface for the tank. At the upper ends of the pipes 13 and 14 there are connected by elbows 17 and short pipes 18 to a T 19 having one portion thereof extending through the top of the tank, the pipes and their fittings forming a double passage for liquid from the bottom to the top of the tank.

At the bottom a short pipe 20 may be connected to the T 11 extending through the wall of the combustion chamber and having a draw-off cock 21 at the outside of the tank.

The lower end of one of the tubes 16 is preferably at a higher elevation than the lower end 15 so that the heat which collects at the bottom of the tank will pass more readily from the tube 16. This tube is provided with a restriction either by inserting a baffle 22 of spiral or other shape, as shown in Figure 3, or by providing a top ring or collar 23 which fits loosely about the pipe 14. If desired, an adjusting member 24 may be mounted above the ring and movable to further restrict the opening. The upper end of the other pipe 15 is left entirely open and unrestricted. These pipes or flues 15 and 16 conduct the hot gases through the tank and are ordinarily connected at their tops to a discharge flue or chimney, not shown.

A water admission pipe 25 extends through the top of the tank to a point adjacent the bottom and a discharge or outlet pipe 26 is connected through the top for taking hot water from the upper end of the tank.

A similar tank structure is shown in Figure 2 with the exception that only a single water pipe 14 extends through the tank which is connected to the top and bottom by elbows 27 and short nipples 28. If desired, a heat flue 29 may be provided for extending through the tank and terminating at its lower end below the ends of the flue 16, but this pipe 29 does not have an interior water pipe and therefore may be of smaller diameter than the tube or flue 16.

The burner which is mounted in the combustion chamber at the bottom of the tank comprises an outer shell 30 secured to the bottom 5, an inner shell 31 threaded through the bottom 5 and carrying at its upper end a disc 32 which makes a restricted opening about the upper edge of the shell 30 by the adjustment of the inner shell 31, the space 33 between the shells constituting a mixing chamber for a fuel as gas and air admitted through a pipe 34 at one end of a reduction fitting 35 which is connected by a short nipply 36 through one side of the outer shell 30. Extending from the bottom of the fitting 31 and through the bottom 5 is a short air admission pipe 37 having a variable admission device 38 at its lower end adjustable from the under side of the tank for admitting the primary air to contact directly with a fuel nozzle 39 which extends above the air admission pipe within the fitting 35. If desired, the interior of the pipe 36 may be shaped to provide a Venturi tube 40 for insuring a good mixture of the fuel and the primary air.

Surrounding the shell 30 and at a distance therefrom is a cylindrical wall 41 communicating with openings 42 through the bottom 5 and providing a secondary air supply at the outside of the mixing chamber 33 as well as an inside supply of secondary air through the tube 31. At the top of the wall 41 is a plate 43 which is adjustable in a support 44, as by means of a threaded stem 45 and the support 44 may be secured to or formed integral with a pipe fitting 8 which extends above the plate 43.

It will be seen that the air adjustment means are located at the bottom of and within the combustion chamber and the adjustment of the exit opening in the upper part of flue 16 has little or no effect on the rapidity with which the products of combustion pass through the combustion chamber.

The passage of the heat gases through the chamber 4 creates a suction of air through the air intake openings of the burner and the combustion chamber, and the movement of the heat gases through the lower part of the combustion chamber is at all times rapid and unrestricted.

The inner shell 31 may be raised or lowered for the purpose of increasing or reducing the aperture between the inner and outer shell 31 and 30, thus increasing or reducing the outlet for the combustible mixture, and consequently also the proportion of primary air which passes through the mixing tube and chamber 33.

The gas burner has an adjustable air intake in one end through which the combustible mixture of gas and air passes during operation and can be adjusted more efficiently when the outlet for the combustible mixture also is adjustable.

During the operation of the burner, secondary air enters the combustion chamber 4 through the central opening in the burner top and is conducted outwards to the point of combustion by the deflecting plate 43 which preferably extends beyond the outer edge of the burner wall 41.

The deflecting plate above the burner top is preferably adjustable, so that the distance between the same and the upper end of the air passage may be increased or reduced, and the volume of secondary air supplied to the point of combustion properly adjusted without reducing the rapidity with which it enters and passes through the zone of combustion. The combination of these two adjustments provides for a better mixture at the proper place.

The flue pipes 15 and 16 extend from the combustion chamber below the tank to the top thereof, and serve to conduct the products of combustion to the atmosphere above the heater and to transmit the greatest possible proportion of the heat contained in the products of combustion through the flue walls to the water in the tank.

The object of the restriction of one of the tubes 16 is to induce the heated gases to enter the flue pipe which has a contracted upper end and to restrict their passage therethrough, so that they will be brought into closer and more intimate contact with the heating surfaces therein and a greater proportion of heat will be transmitted to the water in the tank.

The lower end of the flue pipe 16 being at a higher level than that of the flue 15, causes the heated gases, which on account of their gravity always seek the highest possible level at all times, to move toward and through flue pipe 16 and to enter the flue 15 (or 29) only when the passage through the other flue pipe is insufficient to carry off the full volume of gases from the combustion chamber.

A reduced passage at the upper end of the flue pipe 16, causes a portion thereof to seek an outlet through the rear flue, which is fully open all the way, and will carry off all the surplus without restriction. A proper adjustment of the flue pipe 16 causes a restriction of the passage of the heat gases therethrough, bringing them into close and intimate contact with the heat absorbing elements therein and with all of the bottom of the tank, and to a level with the lower part of the opposite flue pipe 15 before the gases enter the latter.

The purpose of the combination of two flue pipes and the reduction of the upper end of one of the flue pipes said flue pipes terminating at different levels in the combustion chamber is to cause a better contact between the upwardly moving heated gases and the heat absorbing elements in the flue pipe having a restricted exit opening and the entire bottom of the tank and to prevent any restriction of the heated gases from causing a congestion within the zone of combustion which would interfere with the generation of heat.

For the purpose of increasing the heating surface and improving the circulation of water in the tank, the hot water circulating pipe is connected to the bottom thereof, preferably at its center and on a line between the lower ends of the two flue pipes, extends for a short distance below and approximately parallel with the bottom of the tank in the heated portion of the combustion chamber, turns upward at a point directly below the lower ends of the flue pipes, extends upward through the said flue pipes to a point above their upper ends, taking a horizontal direction above the top of the tank to which it is connected preferably at the center thereof.

By spacing the water circulating pipes and the bottom of the tank above the burner they not only receive the heat most efficiently, but also bearing no large horizontal surface in contact with the flame there is little tendency to form a coating of lime or other minerals which is so detrimental to some heaters.

The circulating pipe may be either single as illustrated in Fig. 2 or double as in Fig. 2, extending through one or both of the flue pipes. Evidently the tank may be provided with only one or a greater number of flue pipes and a circulating pipe may have a greater number of branches to increase the heating surface and water heating capacity thereof, without departing from the spirit or scope of the invention.

I claim:

1. In a tank water heater, a storage tank at the top and an enclosed combustion chamber at the bottom, heating means in the combustion chamber spaced from the bottom of the water tank, gas flues extending through the storage tank and terminating at different levels in the combustion chamber below the tank, a water circulation pipe connected to the top and bottom of the storage tank and extending through one of the flues and means for restricting one of the flues so that the surplus of combustion gases will pass through another flue.

2. A tank water heater having a water storage portion in the upper part and heat generating means in the lower part, a plurality of flues extending upwardly through the storage tank for the passage of heating gases therethrough, the effective entry to one of said flues being located below the entry to the other, and means restricting the escape of gases from said other flue.

3. A tank water heater having a water storage portion in the upper part and heat generating means in the lower part, a plurality of flues extending upwardly through the storage tank for the passage of heating gases therethrough, the lower end of one of the pipes extending further below the bottom of the tank than the other, and means at the upper end of said other flue for restricting the flow of gases therethrough.

4. A tank water heater comprising a storage tank in the upper part, a combustion chamber in the lower part, a plurality of flue pipes extending vertically through the storage tank, one or more of said flue pipes having a restricted upper end to retard the passage of the heat gases therethrough and the lower end of one of the flue pipes extending further below the bottom of the tank than the other.

5. A water heater comprising a water storage tank; a combustion chamber below said tank; fuel consuming means in said combustion chamber; a plurality of flue pipes extending from said combustion chamber upwardly through said tank; one of said flues being restricted at its upper end and another having its effective entry located below the entry to said restricted flue; circulating pipes disposed within the flue pipes; a connection between the lower ends of said pipes and the central portion of the bottom of said tank; and a connection between the upper ends of said pipes and the top of said tank.

6. A water heater comprising a water storage tank; a combustion chamber below said tank; fuel consuming means in said combustion chamber; and a plurality of flue pipes extending from said combustion chamber upwardly through said tank, one of said flues being restricted at its upper end and another having its effective entry below the entry to said restricted flue.

7. A water heater comprising a water storage tank; a combustion chamber below said tank; fuel consuming means in said combustion chamber; a plurality of flue pipes extending from said combustion chamber upwardly through said tank, one of said flues being restricted at its upper end and another having its effective entry located below the entry to said restricted flue; and means for regulating the entry of air to the combustion chamber.

8. A water heater comprising a water storage tank; a combustion chamber below said tank; fuel consuming means in said combustion chamber; a plurality of flue pipes extending from said combustion chamber upwardly through said tank, one of said flues being restricted at its upper end and another having its effective entry located below the entry to said restricted flue; circulating pipes disposed within said flue pipes and operatively connected with said tank; and means for regulating the entry of air to the combustion chamber.

9. A tank water heater having a water storage portion in the upper part and heat generating means in the lower part, a plurality of upwardly extending flues for the passage of heating gases and arranged to apply heat to the water in said storage portion, the effective entry to one of said flues being located below the entry to the other, and means restricting the escape of gases from said other flue.

THOMAS A. RONSTROM.